US010931171B2

(12) United States Patent
Chatterjee et al.

(10) Patent No.: US 10,931,171 B2
(45) Date of Patent: Feb. 23, 2021

(54) METHOD AND APPARATUS FOR COOLING A ROTOR ASSEMBLY

(71) Applicant: GE AVIATION SYSTEMS LLC, Grand Rapids, MI (US)

(72) Inventors: Anirban Chatterjee, Bangalore (IN); Mamatha Ramakrishnaiah, Bangalore (IN); Samir Dey, Mason, OH (US); Mohammad Khaja Mohiddin Shaik, Bangalore (IN); Balamurugan Sridharan, Bangalore (IN); Rajendra Vishwanath Pawar, Bangalore (IN); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 200 days.

(21) Appl. No.: 16/144,309

(22) Filed: Sep. 27, 2018

(65) Prior Publication Data

US 2020/0106342 A1 Apr. 2, 2020

(51) Int. Cl.
*H02K 9/193* (2006.01)
*B64D 33/08* (2006.01)
*F01D 15/10* (2006.01)
*H02K 7/18* (2006.01)

(52) U.S. Cl.
CPC .............. *H02K 9/193* (2013.01); *B64D 33/08* (2013.01); *F01D 15/10* (2013.01); *H02K 7/1823* (2013.01); *F05D 2220/76* (2013.01)

(58) Field of Classification Search
CPC ............ H02K 9/10; H02K 9/19; H02K 9/193; H02K 5/20; H02K 7/1823; B64D 33/08; F01D 15/10; F05D 2220/76

USPC ...................................... 310/54, 59, 60 R, 61
See application file for complete search history.

(56) References Cited

U.S. PATENT DOCUMENTS

| | | | |
|---|---|---|---|
| 4,091,301 A | 5/1978 | Blank | |
| 4,943,746 A | 7/1990 | Scherzinger | |
| 5,003,207 A | 3/1991 | Krinickas et al. | |
| 5,140,204 A | 8/1992 | Cashmore | |
| 5,644,179 A * | 7/1997 | Staub | H02K 3/24 310/270 |
| 6,087,745 A * | 7/2000 | Dreher | H02K 3/24 310/58 |
| 6,759,770 B1 * | 7/2004 | Wang | H02K 3/24 310/261.1 |
| 6,759,771 B2 | 7/2004 | Doherty | |
| 6,844,637 B1 | 1/2005 | Smith | |
| 7,061,154 B2 | 6/2006 | McDowall | |
| 7,146,707 B2 | 12/2006 | Tornquist | |

(Continued)

FOREIGN PATENT DOCUMENTS

JP 2006081367 A 3/2006

OTHER PUBLICATIONS

European Patent Office, Extended European Search Report re Application No. 19199946.5-1201, dated Feb. 10, 2020, 9 pages, Munich, Germany.

*Primary Examiner* — Jeremy A Luks
(74) *Attorney, Agent, or Firm* — McGarry Bair PC (57) ABSTRACT

A method and apparatus for a rotor assembly. The rotor assembly includes a rotor core having a rotatable shaft and defining at least one rotor post, a winding wound around the post that defines an end turn, and at least one coolant conduit defined in part by an end support and in a thermally conductive relationship with a portion of the winding.

20 Claims, 6 Drawing Sheets

(56) References Cited

U.S. PATENT DOCUMENTS

| | | | |
|---|---|---|---|
| 7,208,854 B1 | 4/2007 | Suban et al. | |
| 7,541,714 B2 * | 6/2009 | Parsania | H02K 1/32 310/214 |
| 8,018,114 B2 | 9/2011 | Rasmussen | |
| 8,138,642 B2 | 3/2012 | Lemmers, Jr. | |
| 9,680,343 B2 * | 6/2017 | Draina | H02K 3/24 |
| 9,819,239 B2 | 11/2017 | Pal | |
| 2004/0066098 A1 | 4/2004 | Doherty et al. | |
| 2010/0194234 A1 | 8/2010 | Burnett | |
| 2013/0076169 A1 | 3/2013 | Pal | |
| 2016/0211712 A1 | 7/2016 | Patel | |

* cited by examiner

METHOD AND APPARATUS FOR COOLING A ROTOR ASSEMBLY

BACKGROUND

Electric machines, such as electric motors or electric generators, are used in energy conversion. In the aircraft industry, it is common to combine a motor mode and a generator mode in the same electric machine, where the electric machine in motor mode functions to start the engine, and, depending on the mode, also functions as a generator. Regardless of the mode, an electric machine typically includes a rotor having rotor windings that are driven to rotate by a source of rotation, such as a mechanical or electrical machine, which for some aircraft may be a gas turbine engine. A cap or end support can contribute to retaining the rotor windings as they rotate.

BRIEF DESCRIPTION

In one aspect, the present disclosure relates to an end support for a rotor assembly having a bottom bracket support configured to at least partially underlie an end turn of a set of rotor windings, relative to a rotational axis of the rotor assembly, and defining a cavity relative to the end turn, and a top bracket support configured to at least partially overlie the end turn, and defining a collection surface angled to redirect coolant. The bottom bracket support and top bracket support are coupled such that coolant received by the cavity is radially expelled through the cavity, past the end turn, and collected and redirected by the collection surface.

In another aspect, the present disclosure relates to a rotor assembly for an electric machine including a rotatable shaft having a rotatable axis and defining a first coolant conduit fluidly connected with a source of coolant, a rotor core fixed relative to the rotatable shaft and defining at least one rotor post, a winding wound around the rotor post and defining a winding end turn extending axially beyond the rotor core, and an end support fixed relative to the rotatable shaft, the end support overlying the winding end turn and defining a second coolant conduit in a thermally conductive relationship with the winding end turn, the second coolant conduit fluidly connected with the first coolant conduit and configured to radially expel a coolant past the winding end turn and radially outward from the rotor assembly. Heat from the winding end turn is transferred by conduction to the second coolant conduit.

In yet another aspect, the present disclosure relates to a method of cooling a set of rotor winding end turns of a rotor assembly, including receiving a fluid coolant flow to an end support having a bottom bracket support underlying the set of rotor winding end turns and a top bracket support overlying the set of rotor winding end turns, the fluid coolant flow radially received by the bottom bracket support and directed to the set of rotor winding end turns, delivering the fluid coolant flow through a set of radial end turn passages extending radially through the set of rotor winding end turns and in a thermally conductive relationship with the set of rotor winding end turns, collecting, at a collection surface of the top bracket support, the fluid coolant flow from the set of radial end turn passages; and redirecting, by the collection surface, the fluid coolant flow radially outward from the rotor assembly. The fluid coolant flow removes heat from the rotor assembly.

DETAILED DESCRIPTION

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

The exemplary drawings are for purposes of illustration only and the dimensions, positions, order and relative sizes reflected in the drawings attached hereto can vary.

Figure 1:
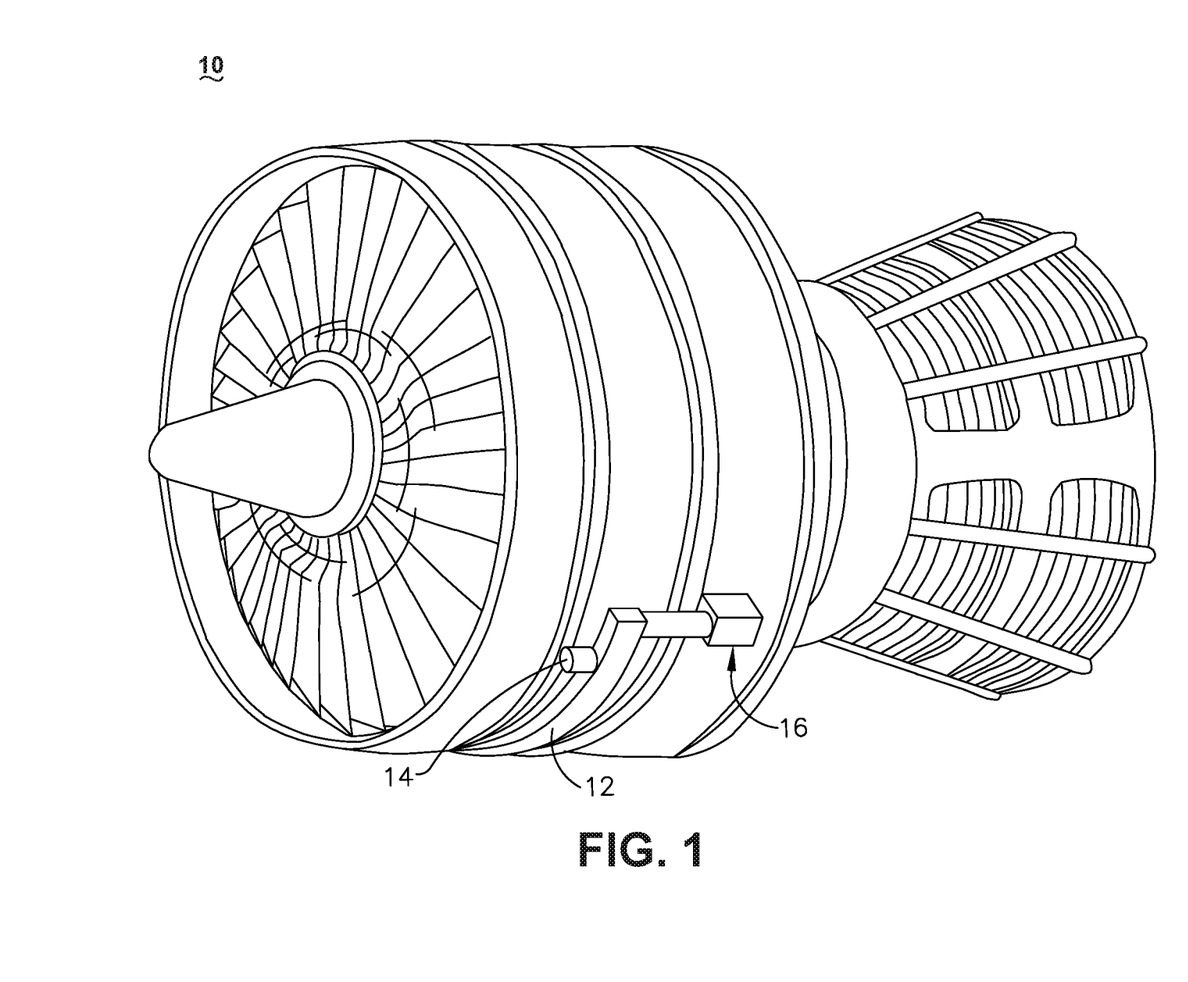
FIG. 1 is an isometric view of a gas turbine engine having a generator, in accordance with various aspects described herein.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure can include any electrical machine or generator.

Figure 2:
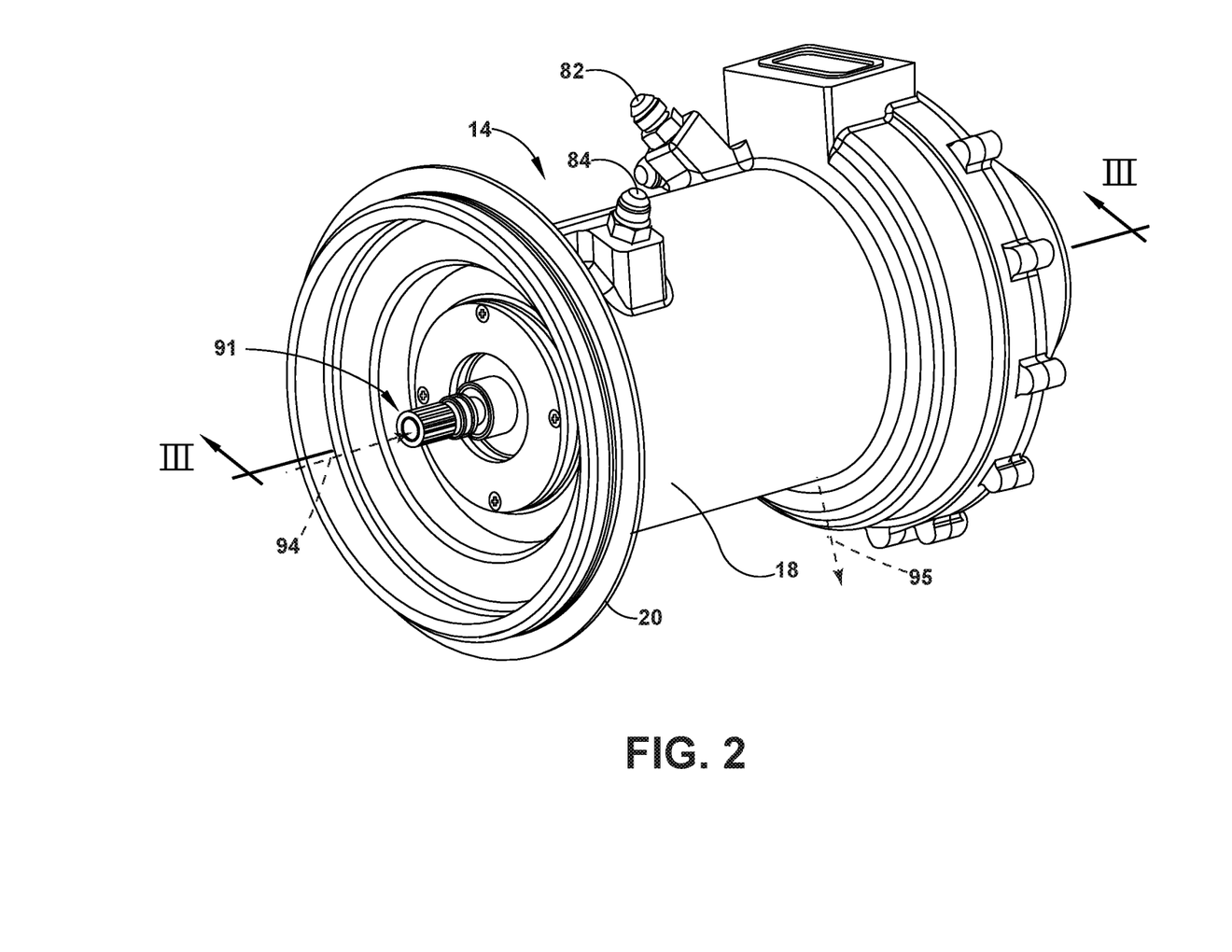
FIG. 2 is an isometric view of an exterior of the generator of FIG. 1, in accordance with various aspects described herein.

FIG. 2 more clearly illustrates a non-limiting example generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and output ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump to forcibly supply the coolant through the ports 82, 84, 94, 95 or generator 14.

Figure 3:
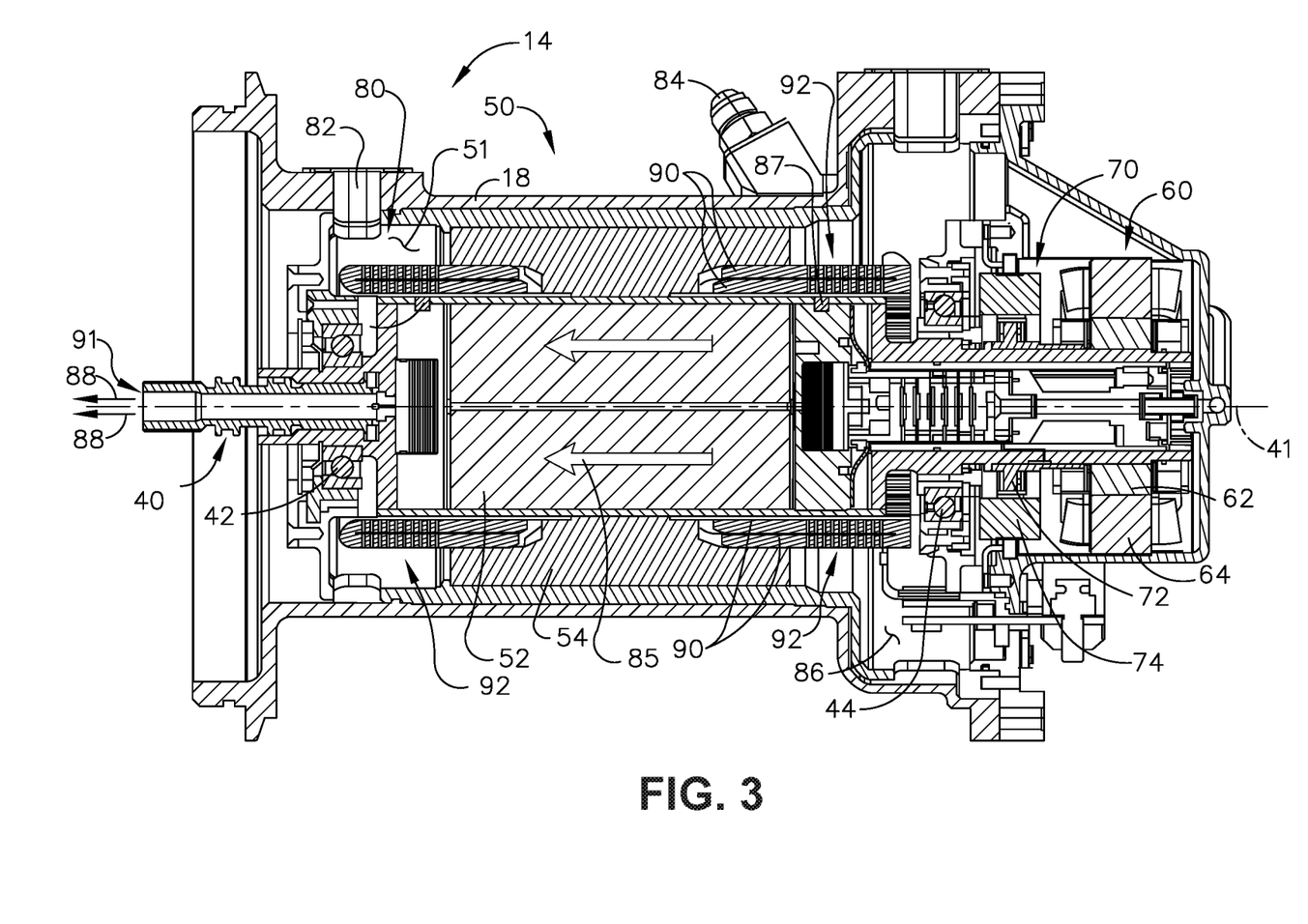
FIG. 3 is a schematic cross-sectional view of the generator of FIG. 2, taken along line of FIG. 2, in accordance with various aspects described herein.

A non-limiting interior of the generator 14 is best seen in FIG. 3, which is a cross-sectional view of the generator 14 shown in FIG. 2 taken along line A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include a main machine 50, housed within a main machine cavity 51, an exciter 60, and a permanent magnet generator (PMG) 70. The corresponding rotating component comprises a main machine rotor 52, an exciter rotor 62, and a PMG rotor 72, respectively, and the corresponding fixed component comprises a main machine stator 54 or stator core, an exciter stator 64, and a PMG stator 74. In this manner, the main machine rotor 52, exciter rotor 62, and PMG rotor 72 are disposed on and co-rotate with the rotatable shaft 40. The fixed components can be mounted to any suitable part of the housing 18, and include the main machine stator 54, exciter stator 64, and PMG stator 74. Collectively, the fixed components define an interior through which the rotatable shaft 40 extends and rotates relative to.

It will be understood that the main machine rotor 52, exciter rotor 62, and PMG rotor 72 can have a set of rotor poles, and that the main machine stator 54, exciter stator 64, and PMG stator 74 can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a main machine stator 54.

The components of the generator 14 can be any combination of known generators. For example, the main machine 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can be oil cooled and thus can include a cooling system 80. The cooling oil can be used to dissipate heat generated by the electrical and mechanical functions of the generator 14. The cooling system 80 using oil can also provide for lubrication of the generator 14. In the illustrated aspects, the generator 14 can be a liquid cooled, wet cavity cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the main machine rotor 52, exciter rotor 62, and PMG rotor 72, as well as an rotor shaft cooling fluid outlet 88, such as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
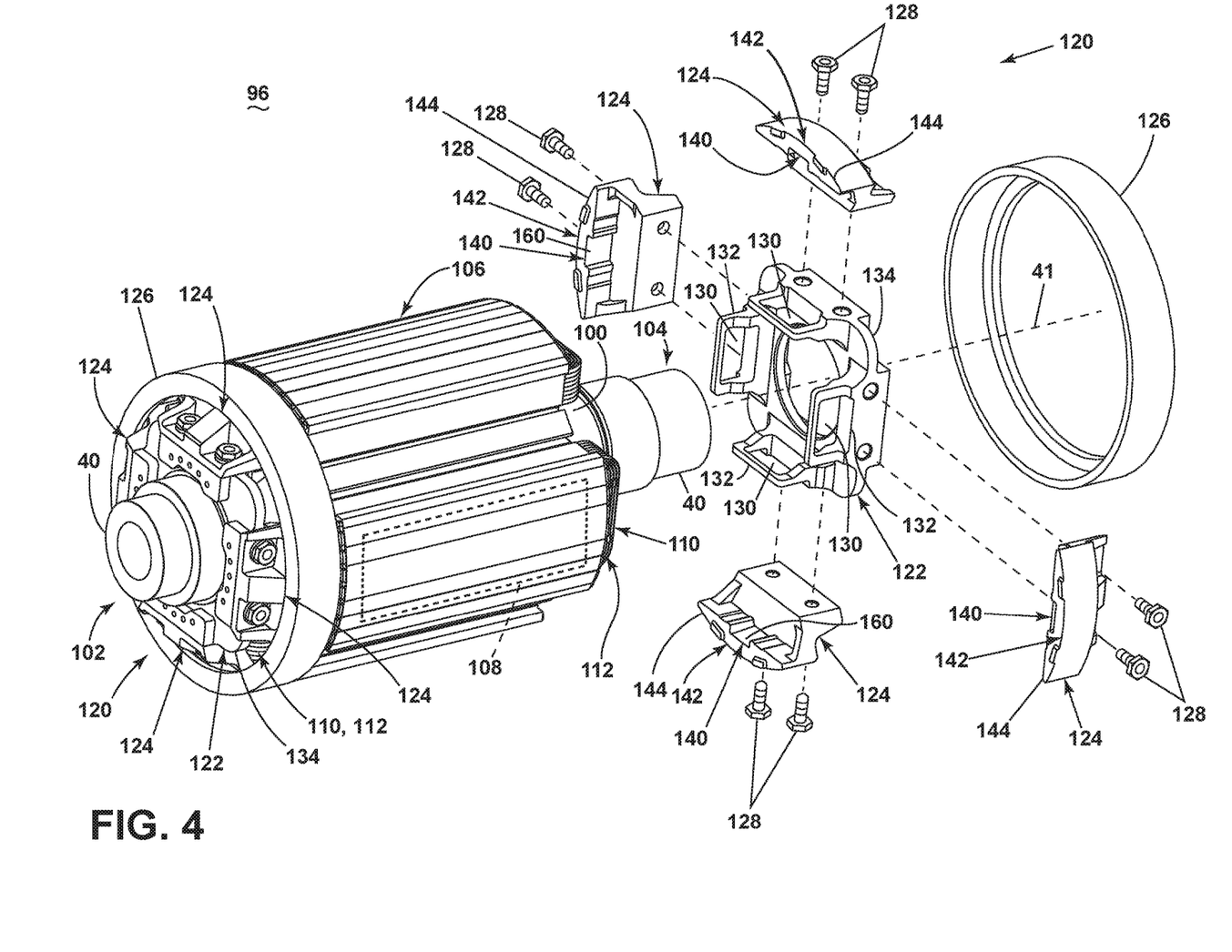
FIG. 4 illustrates a partially exploded isometric view of a rotor assembly and end support for the generator of FIG. 3, in accordance with various aspects described herein.

FIG. 4 illustrates an isometric view of a main machine rotor assembly 96. As shown, the rotor assembly 96 can include a rotor core 100, such as a laminated rotor core, rotatably connected to co-rotate with the rotatable shaft 40. The rotor assembly 96 can further define a first end 102 and a second end 104, axially spaced from the first end 102. The rotor assembly 96 can include at least one rotor pole 106 defined by a rotor post 108 and formed when at least a portion of the rotor core 100 is wound with a conductive rotor wiring or windings 110 about the rotor post 108. The rotor windings 110 wound around the rotor post 108 can define rotor winding end turns 112 extending axially beyond the rotor core 100. In the perspective of the illustrated example, the rotor post 108 can underlie the set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

FIG. 4 further illustrates the end support 120 coupled the rotatable shaft 40 of the rotor assembly 96 at first end 102. At the second end 104, the end support 120 is illustrated in a partially exploded view. By way of non-limiting example, the end support 120 can be fixed to the rotatable shaft 40 using one or more bolts, screws, pins, or other known fasteners. It is also contemplated that the end support 120 and the rotatable shaft 40 can be fixed by any affixing mechanisms. The end support 120 can include a bottom bracket support 122 and a set of top bracket supports 124. As used herein, "bottom" in the bottom bracket support 122 denotes a radially underlying positioning, relative to the "top" or overlying top bracket support 124. Optionally, the end support 120 can include a supportive ring 126 further radially or circumferentially overlying the set of top bracket supports 124. At least one connector 128 can fix the bottom bracket support 122 relative to the top bracket support 124. By way of non-limiting example, the at least one connector 128 can be one or more bolts, screws, pins, or other known fasteners. It is also contemplated that the bottom bracket support 122 and the top bracket support 124 can be fixed relative to one another by any affixing mechanisms.

The bottom bracket support 122 can at least partially underlie the rotor winding end turns 112. In this example, "underlie" denotes a relative position radially closer to the rotational axis 41. The bottom bracket support 122 includes a set of rounded rectangular protrusions 132 extending in an axial direction from a base 134 and defining a respective cavity 130 (also herein "first cavity 130") relative to and also underlying one of the sets of rotor winding end turns 112. While a rounded rectangular protrusion 132 is described, additional structural or geometric configurations can be included to define a cavity underlying at least a portion of one of the sets of rotor winding end turns 112.

The top bracket support 124 can at least partially overlie one of the sets of rotor winding end turns 112.

The top bracket support 124 can also include a coolant outlet 142 associated with a collection surface 140 underlying at least a portion of the top bracket support 124. The coolant outlet 142 can be positioned, by way of non-limiting example, at a radially outer surface 144 of the top bracket support 124. In one non-limiting example, the collection surface 140 can be configured relative to the top bracket support 124 such that a liquid received by the collection surface 140 (such as in a radially outward direction) is collected and redirected by the collection surface 140 toward the coolant outlet 142. The collection surface 140, by way of non-limiting example, can include an indention or recession at a radially-inwardly-facing surface of the top bracket support 124, which can further define a second cavity 160. Additionally or alternatively, the collection surface 140 can include other known fluid direction geometries or components.

Figure 5:
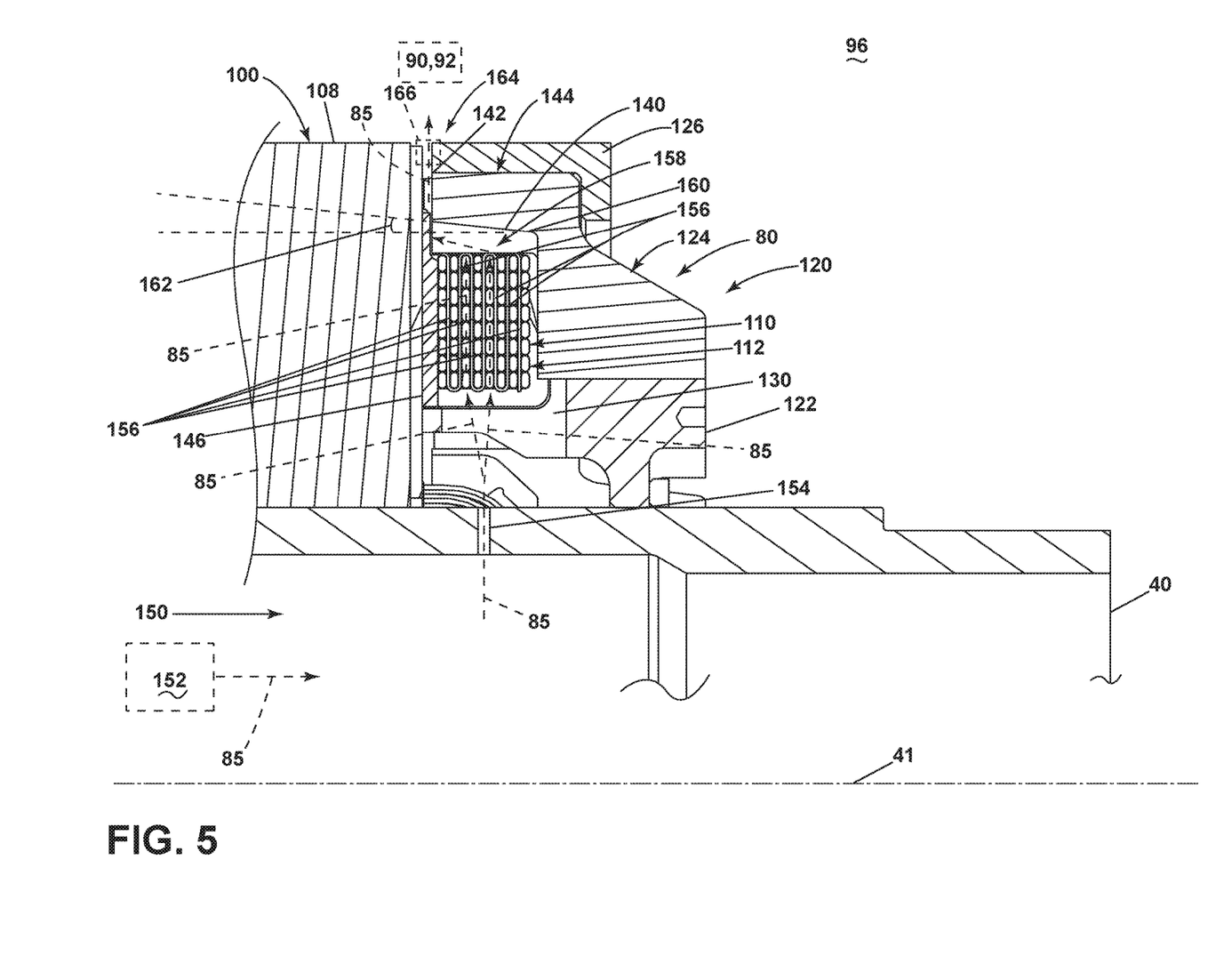
FIG. 5 illustrates a zoomed cross-sectional view of the end support of the rotor assembly of FIG. 4, in accordance with various aspects described herein.

FIG. 5 illustrates a portion of the rotor assembly 96 of FIG. 4 for better understanding the cooling system 80 and fluid coolant flow 85 from the rotatable shaft 40 to the set of stator winding end turns 92.

The rotatable shaft 40 defines a first coolant conduit 150 fluidly connected with a source of coolant 152. The source of coolant 152 can be, but is not limited to the cooling fluid inlet port (not shown). The direction or location of the source of coolant 152 is not limited by the illustration and can be considered in any location that is fluidly coupled to the first coolant conduit 150. It is further considered that additional conduit, pumps, valves, or other devices can be included to fluidly connect the source of coolant 152 and the first coolant conduit 150.

A first radial coolant passage 154, by way of extending radially through the rotatable shaft 40, fluidly connects the first coolant conduit 150 and the cavity 130 that underlies at least a portion of the rotor winding end turns 112. As shown, the rotor winding end turns 112 can include a set of radial rotor end turn passages 156 as used herein the set of radial rotor end turn passages 156 refers to a set of radially extending passages between the rotor windings 110 that fluidly couple the first cavity 130 to the second cavity 160.

In one non-limiting example, the cavity 130, or the rounded rectangular protrusion 132 (FIG. 4) defining the cavity 130, can be configured to overlie the fluid output volume from the first radial coolant passage 154, such that fluid expelled from the first radial coolant passage 154 is received by the cavity 130. The cavity or the rounded rectangular protrusion 132 defining the cavity 130, can be configured to limit or restrict where fluid received from the first radial coolant passage 154 traverses radially, axially, or a combination thereof, such that the fluid is reliably delivered from the cavity 130 to the rotor winding end turns 112 or the radial rotor end turn passages 156. A second coolant conduit 158 can be defined at least in part by the end support 120. By way of non-limiting example, the second coolant conduit 158 can be defined in part by the top bracket support 124 of the end support 120 which overlies the rotor winding end turns 112.

The second coolant conduit 158 can contribute to a fluid delivery between the first coolant conduit 150 and the coolant outlet 142. The second coolant conduit 158 is fluidly connected with the first coolant conduit 150 via the first cavity 130 and can radially expel the fluid coolant flow 85 from the first cavity 130 past the rotor winding end turns 112. The second coolant conduit 158 can have radial rotor end turn passages 156 that are included in the rotor winding end turns 112 and extend radially through the rotor winding end turns 112. In this sense, the radial rotor end turn passages 156 can be fluidly connected with both the first cavity 130 and the second cavity 160.

Also as illustrated, the collection surface 140 can be angled relative to the rotational axis 41, shown as angle 162, such that the collection surface 140 receives and redirects the fluid coolant flow 85 expelled radially outward from the second coolant conduit 158. Optionally, the fluid coolant flow 85 can be received and redirected by the second cavity 160 defined by the collection surface 140. The angle 162 can be configured to further redirect fluid received by the collection surface 140 toward the coolant outlet 142.

The second coolant conduit 158 is fluidly connected with the coolant outlet 142 via the collection surface 140 such that the rotation of the rotatable shaft 40 about the rotational axis 41 radially expels the fluid coolant flow 85 past the rotor winding end turns 112 and radially outward from the rotor assembly 96.

Fluid can enter the rotatable shaft 40 of the rotor assembly 96 via the inlet port 82. The rotatable shaft 40 at least in part, can define the first coolant conduit 150, through which fluid can flow radially outward from the rotational axis 41. Fluid from the first coolant conduit 150 can pass through the first radial coolant passage 154 to be radially received by the bottom bracket support 122 of the end support 120 that at least in part defines the first cavity 130. Fluid can continue to flow radially outward through the first cavity 130 and through the radial rotor end turn passages 156 that pass between the rotor windings 110, that form the second coolant conduit 158. After passing through the radial rotor end turn passages 156 of the second coolant conduit 158, the fluid can enter the second cavity 160. The fluid in the second cavity 160 is collected by the collection surface 140 and directed to the coolant outlet 142. As the fluid flows through the coolant outlet 142, it leaves the rotor assembly 96. It is contemplated that the fluid can be, but is not limited to, coolant.

The coolant outlet 142 can be disposed at the radially outer surface 144 or an outer circumference 164 of the rotor assembly 96. Optionally, the coolant outlet 142 can be a nozzle 166 configured to direct coolant toward the set of stator windings 90 or the set of stator winding end turns 92. The coolant outlet 142 or nozzle 166 can be at least partially defined by, in contact with, or coupled to an insulating layer 146 located axially between at least part of the rotor core 100 and the end support 120.

During operation of the generator 14, the rotation of the magnetic field generated by the set of main machine rotor windings 110 relative to the set of main machine stator windings 90 generates electricity in the main machine stator windings 90. This magnetic interaction further generates heat in the set of main machine rotor windings 110 and main machine stator windings 90. In accordance with aspects described herein, coolant can be delivered from the rotatable shaft 40 through first radial coolant passage 154 and collected in the first cavity 130. The first cavity 130 directs coolant through radial rotor end turn passages 156 of the second coolant conduit 158, which transfers heat from the set of main machine rotor windings 110 into the coolant by conduction. The coolant is radially expelled from radial rotor end turn passages 156 into the second cavity 160, where it further collects at the collection surface 140. The angle 162 of the collection surface 140 redirects the fluid coolant flow 85 to the coolant outlet 142, where it is further radially expelled outward to contact the set of main machine stator windings 90. This contacting further removes heat from the main machine stator windings 90 into the coolant.

Figure 6:
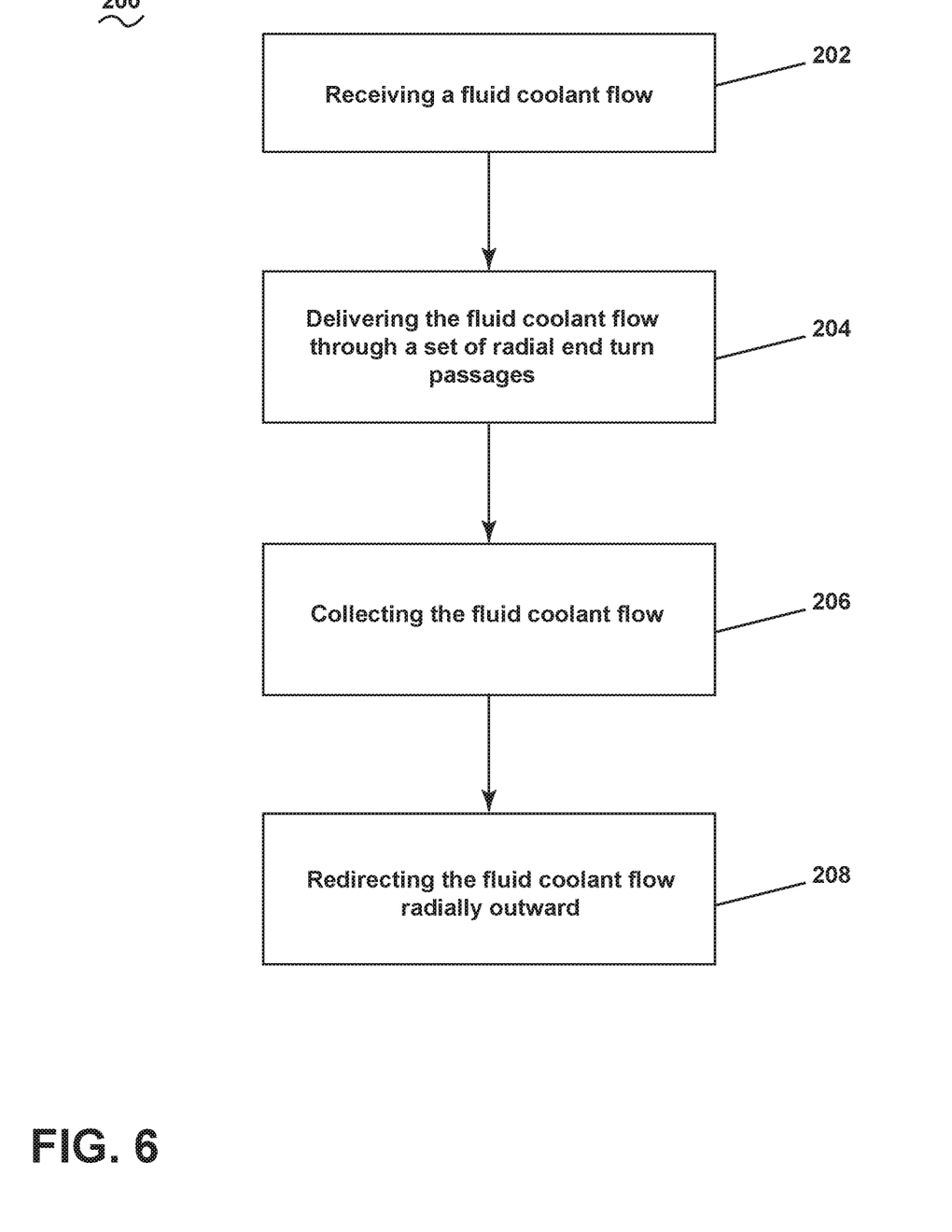
FIG. 6 illustrates an exemplary method flowchart diagram of cooling a rotor assembly, in accordance with various aspects described herein.

FIG. 6 illustrates a method 200 of cooling the set of rotor winding end turns 112 of the rotor assembly 96. At 202, the method 200 includes receiving the fluid coolant flow 85 to the end support 120. A non-limiting example of receiving the fluid coolant flow 85 by the end support 120 can include the fluid coolant flow 85 flowing from the first coolant conduit 150 radially through the first radial coolant passage 154 and into the first cavity 130. The first cavity 130 is defined by the bottom bracket support 122 of the end support 120.

At 204, the fluid coolant flow 85 is delivered through the set of radial rotor end turn passages 156 that extend radially through the set of rotor winding end turns 112. The set of radial rotor end turn passages 156 can be included as part of the second coolant conduit 158 that fluidly connects the first cavity 130 to the coolant outlet 142. The second coolant conduit 158 can be defined in part by the collection surface 140 such that at 206 the fluid coolant flow 85 that flows from the set of radial end turn passages 156 is collected at the collection surface 140.

At 208, the fluid coolant flow 85 is redirected by the collection surface 140 to the coolant outlet 142. The redirection from the collection surface 140 to the coolant outlet 142 allows the fluid coolant flow 85 to flow radially outward from the rotor assembly 96.

One or more of the first cavity 130, the second coolant conduit 158, the set of radial rotor end turn passages 156 or the second cavity 160 are in a thermally conductive relationship with the set of rotor winding end turns 112 so heat from set of rotor winding end turns 112 is transferred by conduction to the second coolant conduit 158. The conduction of heat to the second coolant conduit 158 and the thermally conductive relationships described herein can result in the fluid coolant flow 85 removing heat from the rotor assembly 96.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

It is contemplated that the method 200 can include the expelling, by a nozzle, the redirected fluid coolant flow 85 toward a set of stator windings. It is further contemplated that the method 200 can include redirecting at 208 that further includes redirecting the fluid coolant flow 85 by the collection surface 140 disposed at the angle 162 relative to the rotational axis 41 of the rotor assembly 96.

Many other possible aspects and configurations in addition to that shown in the above figures are contemplated by the present disclosure. For example, one aspect of the disclosure contemplates coolant conduits that extend along alternative portions or lengths of the set of rotor windings 110. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

The aspects disclosed herein provide method and apparatus for cooling a set of rotor windings or a set of rotor winding end turns during electric machine operations (e.g. motor or generator operations). One advantage that may be realized in the above aspects is that the above described aspects have significantly improved thermal conduction to remove heat from the set of rotor windings or the set of rotor winding end turns. The improved thermal conductivity between the set of rotor winding end turns and the coolant conduits coupled with the coolant channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is also informant feature. The above described end assembly can provide additional physics stability and improved cooling to the rotor end windings. The stability and cooling provided by the end support allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An end support for a rotor assembly, comprising:
   a bottom bracket support configured to at least partially underlie an end turn of a set of rotor windings, relative to a rotational axis of the rotor assembly, and defining a cavity relative to the end turn; and
   a top bracket support configured to at least partially overlie the end turn, and defining a collection surface angled to redirect coolant;
   wherein the bottom bracket support and the top bracket support are coupled such that coolant received by the cavity is radially expelled through the cavity, past the end turn, and collected and redirected by the collection surface.

2. The end support of claim 1 wherein the top bracket support further includes a coolant outlet associated with the collection surface such that coolant is collected and redirected by the collection surface to the coolant outlet.

3. The end support of claim 2 wherein the coolant outlet is positioned at a radially outer surface of the top bracket support.

4. The end support of claim 2 wherein the coolant outlet is a nozzle configured to direct coolant toward a set of stator windings.

5. The end support of claim 1 wherein the bottom bracket support and the top bracket support are fixed relative to each other.

6. A method of cooling a set of rotor winding end turns of a rotor assembly, comprising:
   receiving a fluid coolant flow to an end support having a bottom bracket support underlying the set of rotor winding end turns and a top bracket support overlying the set of rotor winding end turns, the fluid coolant flow radially received by the bottom bracket support and directed to the set of rotor winding end turns;
   delivering the fluid coolant flow through a set of radial end turn passages extending radially through the set of rotor winding end turns and in a thermally conductive relationship with the set of rotor winding end turns;
   collecting, at a collection surface of the top bracket support, the fluid coolant flow from the set of radial end turn passages; and
   redirecting, by the collection surface, the fluid coolant flow radially outward from the rotor assembly.

7. The method of claim 6, further comprising expelling, by a nozzle, the redirected fluid coolant flow toward a set of stator windings.

8. The method of claim 6, wherein the redirecting further comprises redirecting the fluid coolant flow by the collection surface disposed at an angle relative to a rotational axis of the rotor assembly.

9. A rotor assembly for an electric machine comprising:
   a rotatable shaft having a rotational axis and defining a first coolant conduit fluidly connected with a source of coolant;
   a rotor core fixed relative to the rotatable shaft and defining at least one rotor post;
   a winding wound around the rotor post and defining a winding end turn extending axially beyond the rotor core; and
   an end support fixed relative to the rotatable shaft and comprising a bottom bracket support and a top bracket support, wherein the top bracket support has a collection surface with a recession at a radially-inwardly-facing surface, the end support overlying the winding end turn and defining a second coolant conduit in a thermally conductive relationship with the winding end turn, the second coolant conduit fluidly connected with the first coolant conduit and configured to radially expel a coolant past the winding end turn and radially outward from the rotor assembly.

10. The rotor assembly of claim 9 wherein the end support includes the bottom bracket support configured to at least partially underlie the winding end turn.

11. The rotor assembly of claim 10 wherein the bottom bracket support defines a first cavity underlying the winding end turn, the first cavity fluidly connected with the first coolant conduit by way of a first radial coolant passage extending through the rotatable shaft.

12. The rotor assembly of claim 11 wherein the first cavity is configured to deliver the coolant to the winding end turn.

13. The rotor assembly of claim 9 wherein the end support includes the top bracket support configured to at least partially overlie the winding end turn.

14. The rotor assembly of claim 13 wherein the top bracket support includes the collection surface at least partially defining a second cavity overlying the winding end turn, the collection surface angled to receive and redirect coolant expelled past the winding end turn.

15. The rotor assembly of claim 14 wherein the collection surface is configured to receive and redirect coolant to a coolant outlet disposed at a circumference of the rotor assembly.

16. The rotor assembly of claim 15 wherein the coolant outlet is a nozzle configured to expel coolant toward a set of stator windings.

17. The rotor assembly of claim 14 wherein the collection surface angled relative to the rotational axis.

18. The rotor assembly of claim 9 wherein the winding end turn includes radial end turn passages extending radially through the winding end turns and in a thermally conductive relationship with the winding end turns.

19. The rotor assembly of claim 18 wherein the second coolant conduit is configured to receive the coolant from the first coolant conduit, and expel the coolant radially outward through the radial end turn passages.

20. The rotor assembly of claim 9 wherein rotation of the rotatable shaft about the rotational axis radially expels the coolant past the winding end turn and radially outward from the rotor assembly.

* * * * *